United States Patent Office 3,262,949
Patented July 26, 1966

3,262,949
7-METHYL ANDROSTANE COMPOUNDS
Howard J. Ringold and George Rosenkranz, Mexico City, Mexico, assignors, by mesne assignments, to Syntex Corporation, a corporation of Panama
No Drawing. Filed Nov. 12, 1957, Ser. No. 695,495
Claims priority, application Mexico, Nov. 13, 1956, 46,335
15 Claims. (Cl. 260—397.3)

The present invention relates to novel cyclopentanophenanthrene derivatives and to a process for their production thereof.

More particularly the present invention relates to androstane derivatives having the oxygenated substituents at C–3 and C–17 conventional in the androstane series and saturated or unsaturated at C–4, and, in addition, a 7-methyl substituent. Included within this definition are those 7-methyl-androstane and 7-methyl-$\Delta^4$-androstene derivatives having a 3-keto group, a 3-hydroxy group, an esterified 3-hydroxy group, a 17-keto group, a 17$\beta$-hydroxy group, an esterified 17$\beta$-hydroxy group, a 17$\beta$-hydroxy together with a 17$\alpha$-lower alkyl group, a 17$\beta$-hydroxy together with a 17$\alpha$-lower vinyl group, and a 17$\beta$-hydroxy together with an ethinyl group. In addition any of the compounds defined above may also have an 11-keto substituent. All of the above compounds are active androgenic type hormones having androgenic and anabolic properties differing from that of testosterone. Thus as an example 7$\alpha$-methyl testosterone is approximately 4.5 times as androgenic as testosterone and about 6 times as anabolic.

In accordance with the present invention it has been discovered that the novel 7-methyl androstane compounds of the present invention may be prepared by treating testostrone or 11-keto testosterone with ethylene glycol to form the 3-cycloethylene ketal of testosterone or 11-keto testosterone and thereafter treating this ketal with a brominating agent to form the corresponding 7-bromo derivative. Treatment with methyl magnesium bromide then formed the corresponding 3-cycloethylene ketal of 7-methyl testosterone or 11-keto testosterone and hydrolysis the novel 7-methyl testosterone or 11-keto testosterone which was of the 7$\alpha$-methyl configuration. Both the 7-methyl testosterones and the 3-cycloethylene ketal of 7-methyl testosterones were intermediates for the production of other 7-methyl androstane derivatives having the conventional androstane substituents at C–3 and C–17 by conventional type reactions as hereinafter set forth.

The novel compounds of the present invention may therefore be illustrated by the following formulas:

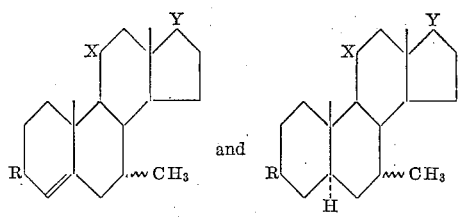

In the above formula R may be =O or OR' and R' may be hydrogen or a hydrocarbon carboxylic acylate of 2 to 12 carbon atoms such as acetate, propionate, butyrate, phenylpropionate, cyclopentylpropionate, hexanoate, enanthrate, caproate, benzoate, trimethyllacetate etc. X may be hydrogen or =O. Y represents =O or $$\diagdown \begin{array}{c} OR^2 \\ R^3 \end{array}$$

and R³ may be hydrogen, lower alkyl (such as methyl, ethyl, or propyl), vinyl or ethinyl, and R² is hydrogen if R³ is other than hydrogen, R² is hydrogen or an acyl group of a hydrocarbon carboxylic acid of 2 to 12 carbon atoms if R³ is hydrogen.

The compounds defined by the above formula are produced by a novel process outlined in part in the following equation:

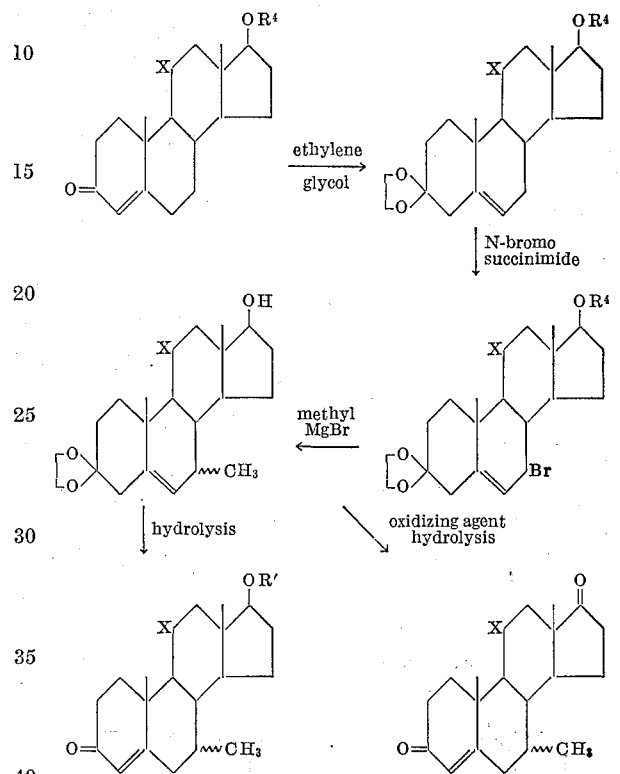

In the above equation R⁴ represents a hydrocarbon carboxylic acyl group of 2 to 12 carbon atoms. R' represents the same groups as heretofore set forth.

In practicing the process above outlined a conventional ester of testosterone for example a hydrocarbon carboxylic ester of 2 to 12 carbon atoms such as the acetate in an organic solvent such as benzene is refluxed with ethylene glycol and a catalyst such as p-toluenesulfonic acid with continuous removal of the water formed during the reaction. The corresponding ester of 3-ethylenedioxy-$\Delta^5$-androsten-17$\beta$-ol is formed. The ketal thus formed is then brominated with an N-bromo-amide or N-bromo-imide such as N-bromosuccinamide preferably in carbon tetrachloride and while exposed to strong light. After refluxing for a few minutes the resultant 7-bromo derivative is separated by conventional means. The 7-bromo ketal thus produced in an organic solvent such as anhydrous benzene is slowly added preferably at room temperature and with stirring to an ether solution of methyl magnesium bromide and the stirring then continued for several hours at room temperature. After separation and purification procedures there is obtained the pure 3-ethylenedioxy-7-methyl-$\Delta^5$-androsten-17$\beta$-ol of 7$\alpha$-methyl configuration. This ketal derivative may be hydrolysed by conventional means, a preferable hydrolysing agent being an acid such as p-toluenesulfonic acid in acetone preferably the hydrolysis takes place at room temperature for a period of about 16 hours. The resultant product after separation is 7$\alpha$-methyl-testosterone. The 7$\alpha$-methyl-testosterone thus produced may be conventionally acetylated with acetic anhydride in pyridine and by similar methods there can be prepared other esters of 7α-methyl-testosterone such as propionate, butyrate, phenylpropionate, cyclopentylpropionate, hexanoate, enanthate, caproate, trimethylacetate and benzoate. As indicated in the above equation oxidation of the 3-monoethyleneketal of 7α-methyl-testosterone with an oxidizing agent such as chromic acid in pyridine forms the corresponding 17-keto compound and hydrolysis of this 7-ketal-17-keto compound as for example with p-toluenesulfonic acid gives the corresponding 7α-methyl-Δ⁴-androsten-3,17-dione.

Another portion of the process for preparing the novel compounds of the present invention is outlined in the following equations:

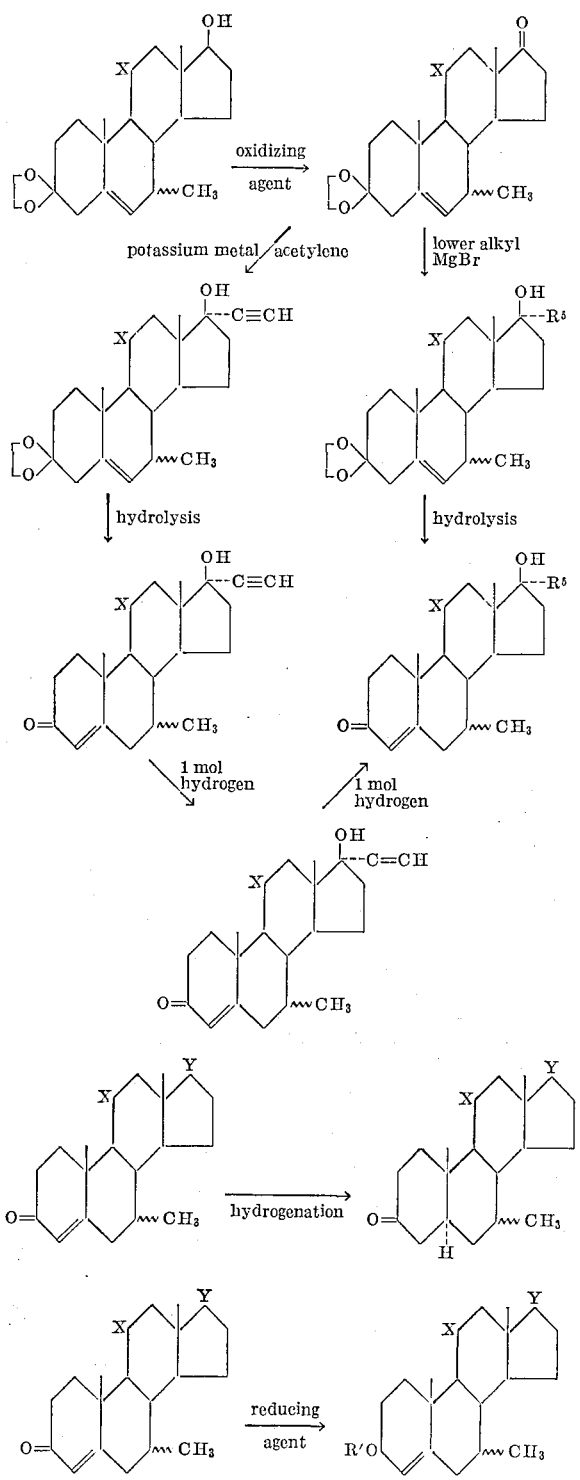

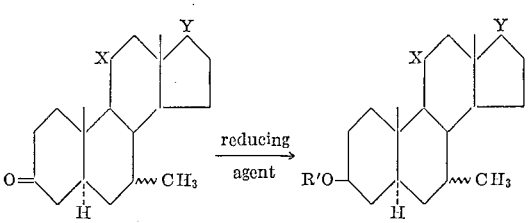

In the above equations $R^5$ represents a lower alkyl group such as methyl, ethyl or propyl. X, Y and R′ represent the same groups as heretofore.

As indicated above the starting compound for the first equation is a 3-cycloethyleneketal of 7α-methyl-testosterone which upon treatment with an oxidizing agent gives the corresponding 17-keto derivative i.e. the monoethyleneketal of 7α-methyl-Δ⁵-androsten-3,17-dione. This compound upon treatment with methyl magnesium bromide gives the corresponding 3-ethylenedioxy-7α,17α-dimethyl-Δ⁵-androsten-17β-ol and a similar treatment with other Grignard type reagents such as ethyl lithium, or propyl lithium gives the corresponding 17α-ethyl or 17α-propyl derivatives. Hydrolysis of the ketal group for example with p-toluenesulfonic acid gives the corresponding 7α-methyl-17α-lower alkyl-testosterone. Similarly a conventional reaction of the monoethylene ketal of the 7α-methyl-Δ⁵-androsten-3,17-dione with potassium metal and acetylene gives the corresponding 7α-methyl-17α-ethinyl-testosterone and reaction with approximately 1 mol of hydrogen in the presence of a palladium on calcium carbonate catalyst gave the corresponding 7α-methyl-17α-vinyl-testosterone which could be further hydrogenated to give the 17α-ethyl derivative identical with that obtained by the previously referred to reaction of ethyl lithium on the original ketal compound. All of the above reactions when performed on 11-keto substituted testosterone derivative give the corresponding 11-keto derivative.

As indicated in the second equation above when 7-methyl-testosterone or any of the other derivatives previously set forth were properly hydrogenated the corresponding androstane derivatives could be obtained. In the case of those compounds which did not have a vinyl or ethinyl group at C-17, hydrogenation in the presence of a palladium on charcoal catalyst until 1 mol of hydrogen had been absorbed resulted in the production of the corresponding saturated androstane derivative. However, all of the compounds even those having an unsaturated C-17 substituent could be hydrogenated with lithium in liquid ammonia in the presence of dioxane and ether. As indicated further in the last two equations above the treatment of any of these compounds with a reducing agent such as lithium aluminum hydride or sodium borohydride gave the corresponding 3-alcohols. In the case where an 11-keto group is present the reducing agent was preferably sodium borohydride in aqueous methanol solution at room temperature. In the absence of a ketone substituent at position C-11 this reducing agent could also be lithium aluminum hydride in a solvent such tetrahydrofurane.

By different process there can be prepared the 7β-methyl derivatives of the androstane compounds heretofore numerated. In this reaction the starting material is the acetate of 3 - ethylenedioxy-Δ⁵-androsten-17β-ol-7-one (J.A.C.S., 78, 5660 (1956)). Reaction of this known compound with methyl magnesium bromide produced the 7 - methyl - 3 - ethylenedioxy-Δ⁵-androsten-7,17β-diol. This last compound upon treatment in an acid medium preferably by heating in acetic acid hydrolysed the ketal group to regenerate the Δ⁴-3-keto grouping with simultaneous dehydration at C-7 to form 7-methyl-Δ⁴,⁶-androstadien-17β-ol-3-one. Selective hydrogenation of the double bond between C-6 and C-7 as with treatment with hydrogen in the presence of palladium on calcium carbonate catalyst until slightly over 1 mol of hydrogen had been absorbed gave 7β-methyl-testosterone. From this compound as a starting intermediate or from the corresponding 3-cycloethyleneketal thereof by precisely the same methods as previously outlined, there was prepared the corresponding 7β-methyl-andostane derivatives having the same substituents at C–3 and C–17. Further by starting with an 11-keto compound there could also be produced 11-keto derivatives.

It may be understood all of the secondary hydroxy groups in the above enumerated compounds may be conventionally converted to the corresponding esters by reaction with the desired acid anhydride or halide so that there may be prepared the corresponding esters conventional in the art. These esters may generally be characterized as hydrocarbon carboxylic acid esters of 2 to 12 carbon atoms.

The following specific examples serve to illustrate but are not intended to limit the present invention.

*Example I*

A mixture of 15 g. of testosterone acetate, 500 cc. of benzene, 80 cc. of ethylene glycol previously distilled over potassium hydroxide and 600 mg. of p-toluenesulfonic acid was refluxed for 6 hours with the use of an adapter for the continuous removal of the water formed during the reaction. The mixture was neutralized with saturated sodium bicarbonate solution, washed with water to neutral, dried with anhydrous sodium sulfate and evaporated to dryness under reduced pressure. Crystallization of the residue from acetone gave the acetate of 3-ethylenedioxy-$\Delta^5$-androsten-17β-ol.

A solution of 15 g. of this ketal in 200 cc. of carbon tetrachloride was refluxed for 8 minutes with 7.7 g. of N-bromosuccinimide, while being exposed to the light of a "Photoflood" lamp. After cooling the solution, the supernatant precipitate was removed by filtration and the filtrate was washed with water, dried with anhydrous sodium sulfate and evaporated to dryness under vacuum. The residue was triturated with hexane, thus giving the acetate of 3-ethylenedioxy-7-bromo-$\Delta^5$-androsten-17β-ol.

A solution of 15 g. of this 7-bromo ketal in 300 cc. of anhydrous benzene was slowly added at room temperature and under stirring to 60 cc. of a 3-normal ether solution of methyl magnesium bromide and then the stirring was continued for 8 hours at room temperature. The mixture was poured into aqueous ammonium chloride solution and stirred; the benzene layer was separated, dried over anhydrous sodium sulfate and evaporated to dryness. The residue was dissolved in a mixture hexane-ether (9:1) and chromatographed in a column of washed alumina. Elution with ether yielded the pure 3-ethylenedioxy-7-methyl-$\Delta^5$-androsten-17β-ol.

*Example II*

200 mg. of p-toluenesulfonic acid was added to a solution of 1 g. of 3-ethylenedioxy-7-methyl-$\Delta^5$-pregnen-17β-ol, obtained in accordance with the previous example, in 80 cc. of acetone and the mixture was kept at room temperature for 16 hours, at the end of which it was poured into water. The precipitate was filtered, washed with water, dried under vacuum and recrystallized from acetone, thus producing 7α-methyl-testosterone.

A mixture of 1 g. of 7α-methyl-testosterone, 8 cc. of anhydrous pyridine and 2 cc. of acetic anhydride was heated on the steam bath for one hour and then poured into water. After keeping the mixture for 1 hour to hydrolyze the excess of anhydride, the product was extracted with ethyl acetate, washed to neutral, concentrated to a small volume and crystallized by the addition of hexane. There was thus obtained the acetate of 7α-methyl-testosterone.

By the same methods, there can be prepared other esters of 7α-methyl-testosterone, such as the propionate, butyrate, phenylpropionate, cyclopentylpropionate, hexanoate, enanthate, caproate, trimethylacetate and benzoate.

*Example III*

10 g. of the 3-monoethyleneketal of 7α-methyl-testosterone, obtained in accordance with Example I, was dissolved in 70 cc. of anhydrous pyridine and mixed with a suspension of 10 g. of chromic acid in 100 cc. of anhydrous pyridine; this suspension had been prepared by adding the powdered chromic acid into the pyridine in four portions until complete disappearance of the dark red color characteristic of chromic acid and keeping the mixture at a temperature below 35° C. by cooling in ice. The mixture was kept at room temperature for 30 hours, diluted with ethyl acetate, filtered through a layer of celite and the solution was washed with water until the washing was colorless, dried over anhydrous sodium sulfate and evaporated to dryness under reduced pressure. The residue crystallized from acetone-hexane containing a few drops of pyridine, thus producing 3-ethylenedioxy-7α-methyl-$\Delta^5$-androsten-17-one.

1 g. of this ketal was hydrolyzed in acetone solution by an analogous method to that described in Example II, to give 7α-methyl-$\Delta^4$-androstene-3,17-dione.

*Example IV*

A solution of 5 g. of the monoethyleneketal of 7α-methyl-$\Delta^5$-androstene-3,17-dione, obtained in accordance with Example III, in 100 cc. of anhydrous benzene was added to 25 cc. of a 3 normal solution of methyl magnesium bromide in ether and the mixture was stirred for 12 hours under anhydrous conditions. After pouring into aqueous ammonium chloride solution and stirring, the benzene layer was separated and evaporated to dryness, leaving as a residue 3-ethylenedioxy-7α,17α-dimethyl-$\Delta^5$-androsten-17β-ol.

Hydrolysis of this ketal by the method described in Example II yielded 7α,17α-dimethyl-testosterone.

*Example V*

5 g. of the 3-monoethyleneketal of 7α-methyl-$\Delta^4$-androstene-3,17-dione, obtained in accordance with Example III, dissolved in 130 cc. of anhydrous toluene was added to a solution of 4.8 g. of potassium metal in 130 cc. of tertiary amyl alcohol which was prepared by slight heating in an atmosphere of nitrogen. A stream of nitrogen was passed through the mixture for 15 minutes, followed by a stream of previously washed acetylene. After 15 hours the mixture was poured into water, acidified with concentrated hydrochloric acid and heated under reflux on the steam bath for half an hour; the solvents were removed by steam distillation, the mixture was cooled in ice and the solid product was collected by filtration. Recrystallization from ethyl acetate gave 7α-methyl-17α-ethinyl-testosterone.

A suspension of 350 mg. of 2% palladium on calcium carbonate catalyst in 50 cc. of pyridine was prehydrogenated for 3 hours at room temperature. There was then added 1.5 g. of 7α-methyl-17α-ethinyl-testosterone and stirred under an atmosphere of hydrogen at room temperature until the equivalent of 1 mol of hydrogen had been absorbed. The solution was filtered through celite, the residue was washed with a little pyridine and the filtrate was evaporated to dryness under vacuum. The residue was dissolved in ether and washed with dilute hydrochloric acid, water, sodium bicarbonate solution and water to neutral, dried over anhydrous sodium sulfate and evaporated to dryness. Recrystallization of the residue form acetone-hexane afforded 7α-methyl-17α-vinyl-testosterone.

1 g. of 7α-methyl-17α-vinyl-testosterone was dissolved in 75 cc. of dioxane containing 0.4 g. of a previously reduced 5% palladium on charcoal catalyst and hydrogenated at room temperature until the equivalent of 1 mol of hydrogen had been absorbed (ca. 30 minutes). The solution was filtered through celite, washing the filter with a little dioxane, and the filtrate and washings were combined and evaporated to dryness under vacuum.

The residue crystallized from acetone to give the pure 7α-methyl-17α-ethyl-testosterone.

The same product was obtained when a solution of 7α-methyl-17α-ethinyl-testosterone was analogously hydrogenated until 2 mols of hydrogen were absorbed.

*Example VI*

2 g. of 7α-methyl-testosterone dissolved in 200 cc. of ethyl acetate was hydrogenated in the presence of 200 mg. of 5% palladium on charcoal catalyst, at room temperature and atmospheric pressure until the equivalent of 1 mol of hydrogen had been absorbed. The catalyst was removed by filtration, the filtrate was evaporated to dryness and the residue dissolved in a mixture of benzene-hexane (1:8). This solution was chromatographed in a column of activated alumina and elution with benzene-ether yielded 7α-methyl-androstan-17β-ol-3-one in pure form.

1 g. of this product was acetylated by the method described in Example II to form the acetate of 7α-methyl-androstan-17β-ol-3-one. Other esters of hydrocarbon carboxylic acids of 2 to 12 carbon atoms as described in Example II were also similarly prepared.

*Example VII*

Hydrogenation of 7α,17α-dimethyl-testosterone or of 7-methyl-17α-ethyl-testosterone by the method described in Example VI, produced 7α,17α-dimethyl-androstan-17β-ol-3-one and 7α-methyl-17α-ethyl-androstan-17β-ol-3-one respectively.

*Example VIII*

A solution of 0.5 g. of 7α-methyl-androstan-17β-ol-3-one, obtained in accordance with Example VI, in 40 cc. of methanol was treated dropwise with a solution of 0.4 g. of sodium borohydride in 6 cc. of water, which was added under stirring and cooling. The stirring was continued for 3 hours at room temperature, at the end of which a few drops of acetic acid was added to decompose the excess of reagent. It was then diluted with 20% sodium chloride solution and the precipitate formed was collected, washed with water and dried under vacuum. By chromatography of the precipitate 7α-methyl-androstane-3β,17β-diol, which predominated in the mixture, was separated from 7α-methyl-androstane-3α,17β-diol.

*Example IX*

A solution of 0.5 g. of 7α-methyl-androstan-17β-ol-3-one in 20 cc. of anhydrous tetrahydrofurane was added dropwise to a mixture of 0.3 g. of lithium aluminum hydride and 20 cc. of anhydrous tetrahydrofurane and the mixture was refluxed for 1 hour. The excess of reagent was destroyed by the cautious addition of acetone; a saturated solution of sodium sulfate was added followed by anhydrous sodium sulfate and the mixture was filtered and the residue washed with hot tetrahydrofurane. The combined filtrate was evaporated to dryness under vacuum leaving a crystalline residue which was redissolved in a mixture ether-hexane and chromatographed in a column of washed alumina. There was thus achieved the separation of 7α-methyl-androstane-3β,17β-diol and 7α-methyl-androstane-3α,17β-diol which were identical to the compounds prepared in accordance with the previous example.

*Example X*

Following analogous procedures to those described in Examples VIII and IX, the reduction of 7α,17α-dimethyl-androstan-17β-ol-3-one and of 7α-methyl-17α-ethyl-androstan-17β-ol-3-one led to the formation of the 3α and 3β-isomers of 7α,17α-dimethyl-androstane-3,17β-diol and of 7α-methyl-17α-ethyl-androstane-3,17β-diol.

By esterification there were prepared the diesters of the 3α and 3β-isomers of 7α-methyl-androstane-3,17β-diol and the 3-monoesters of the isomers of 7α,17α-dimethyl-androstane-3,17β-diol and of 7α-methyl-17α-ethyl-androstane-3,17β-diol.

*Example XI*

The treatment of 7α-methyl-testosterone, 7α,17α-dimethyl-testtosterone or 7α-methyl-17α-ethyl-testosterone with double hydrides, such as has been described in Examples VIII and IX, yielded respectively 7α-methyl-$\Delta^4$-androsten-3,17β-diol, 7α,17α-dimethyl-$\Delta^4$-androstene-3,17β-diol and 7α-methyl-17α-ethyl-$\Delta^4$-androstene-3,17β-diol. The isomers were separated by chromatography.

*Example XII*

Following the methods described in the previous examples, but starting from the acetate of 11-keto-testosterone, there were obtained the following compounds: the acetate of 3-ethylenedioxy-$\Delta^5$-androsten-17β-ol-11-one; the acetate of 3-ethylenedioxy-7-bromo-$\Delta^5$-androsten - 17β - ol - 11 - one; 3 - ethylenedioxy - 7 - methyl-$\Delta^5$ - androsten - 17β - ol - 11 - one; 7 - methyl - 11-keto - testosterone; the acetate of 7 - methyl - 11-keto - testosterone; 3 - ethylenedioxy - 7 - methyl - $\Delta^5$-androstene - 11,17 - dione; 7 - methyl - $\Delta^4$ - androstene-3,11,17 - trione; 3 - ethylenedioxy - 7,17α - dimethyl-$\Delta^5$ - androsten - 17β - ol - 11 - one; 7,17α - dimethyl-11 - keto - testosterone; 7 - methyl - 17α - ethinyl - 11-keto - testosterone; 7 - methyl - 17α - vinyl - 11 - keto-testosterone; 7 - methyl - 17α - ethyl - 11 - keto - testosterone; 7 - methyl - androstan - 17β - ol - 3,11-dione; the acetate of 7 - methyl - androstan - 17β - ol - 3,11-dione; 7,17α - dimethyl - androstan - 17β - ol - 3,11-dione; 7 - methyl - 17α - ethyl - androstan - 17β - ol-3,11 - dione; the 3α and 3β isomers of 7,17α-dimethyl - androstan - 3,17β - diol - 11 - one and of 7 - methyl - 17α - ethyl - androstane - 3,17β - diol - 11-one; the diesters of the 3α and 3β isomers of 7-methyl-androstan - 3,17β - diol - 11 - one; the 3 - monoesters of the 3α and 3β isomers of 7,17α-dimethyl-androstan-3,17β - diol - 11 - one and of 7 - methyl - 17α - ethyl-androstan - 3,17β - diol - 11 - one; the 3α and 3β isomers of 7 - methyl - $\Delta^4$ - androsten - 3,17β - diol - 11-one, of 7,17α-dimethyl-$\Delta^4$-androsten-3,17β-diol - 11-one and of 7 - methyl - 17α - ethyl - $\Delta^4$ - androsten-3,17β-diol-11-one all of 7α-configuration.

*Example XIII*

A solution of 5 g. of the acetate of 3-ethylenedioxy-$\Delta^5$-androsten-17β-ol-7-one in 125 cc. of anhydrous tetrahydrofurane was mixed with 35 cc. of a 3 N solution of methyl magnesium bromide in ether which was added slowly with stirring while the temperature was kept below 30° C. The stirring was continued at room temperature for 5 hours and then it was poured into 1 lt. of ice water containing 10 g. of ammonium chloride and the product was extracted with ether. The extract was washed with water, dried over anhydrous sodium sulfate, filtered and evaporated to dryness. The residue consisted of the crude 7-methyl-3-ethylenedioxy-$\Delta^5$-androstene-7,17β-diol. The pure sample was prepared by chromatography.

4 g. of the crude 7-methyl-3-ethylenedioxy-$\Delta^5$-androstene-7,17β-diol was mixed with 100 cc. of 80% acetic acid and heated on the steam bath for 90 minutes. After pouring into water the crystalline precipitate was collected, washed with water, dried and recrystallized from acetone, thus giving 7-methyl-$\Delta^{4,6}$-androstadien-17β-ol-3-one, M.P. 197–198° C., $[\alpha]_D$+249° (chloroform), $$\lambda_{max.}^{EtOH}\ 296\text{--}298\ m\mu,\ \log\epsilon\ 4.42.$$

A suspension of 3 g. of 5% palladium on calcium carbonate in 375 cc. of thiophene dry benzene was treated with hydrogen at atmospheric pressure until the uptake of hydrogen ceased, at room temperature and with stirring. There was then added 3 g. of 7-methyl-$\Delta^{4,6}$-androstadien-17β-ol-3-one and the hydrogenation was continued under the same conditions until the equivalent of approximately 1.2 mols of hydrogen had been absorbed. The catalyst was filtered and the solution was evaporated to dryness. Crystallization of the residue from ethyl acetate afforded 7β-methyl-testosterone, M.P. 183–185° C., [α]$_D$+112° (ethanol), $\lambda_{max.}^{EtOH}$ 243 mμ, log ε 4.21

*Example XIV*

The 7β-methyl-testosterone of Example XIII, was treated with ethylene glycol in the presence of benzene and p-toluenesulfonic acid in accordance with the method of Example I. The product was the corresponding 3-ethylenedioxy-7β-methyl-Δ$^5$-androsten-17β-ol.

*Example XV*

Following the procedure of Example III, except that the 3 - monoethyleneketal of 7β - methyl - testosterone of the previous example was used there was prepared the corresponding 3-ethylenedioxy-7β-methyl-Δ$^5$-androsten-17-one. Starting with this intermediate and other 7β-methyl compounds of the two preceding examples following the procedures of Examples II to XIV there was prepared the same 7-methyl-androstane derivatives having a 7β-methyl substituent.

We claim:
1. A compound having the formula:

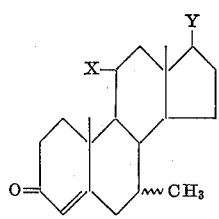

wherein X is selected from the group consisting of hydrogen and keto and Y is selected from the group consisting of keto and

wherein R is selected from the group consisting of hydrogen and the acyl radical of a hydrocarbon carboxylic acid containing from 2 to 12 carbon atoms, inclusive, and R$^1$ is selected from the group consisting of hydrogen, methyl and ethyl.

2. 7-methyl testosterone.
3. The hydrocarbon carboxylic esters of 2 to 12 carbon atoms of 7-methyl testosterone.
4. 7α-methyl testosterone.
5. The hydrocarbon carboxylic esters of 2 to 12 carbon atoms of 7α-methyl testosterone.
6. 7-methyl-Δ$^4$-androsten-3,17-dione.
7. 7-methyl-17α-ethinyl-Δ$^4$-androsten-17β-ol-3-one.
8. 7α-methyl-17α-ethinyl-Δ$^4$-androsten-17β-ol-3-one.
9. 7-methyl-11-keto-testosterone.
10. The hydrocarbon carboxylic esters of 2 to 12 carbon atoms of 7α-methyl-11-keto-testosterone.
11. 7-methyl-Δ$^4$-androsten-3,11,17-trione.
12. 7-methyl-17α-lower alkyl-Δ$^4$-androsten-17β - ol-3,11-dione.
13. 7-methyl-17α-lower alkyl-Δ$^4$-androsten-17β-ol - 3-one.
14. 7α - methyl - 17α - lower alkyl - Δ$^4$ androsten-17β-ol-3-one.
15. 7α,17α-dimethyl-Δ$^4$-androsten-17β-ol-3one.

References Cited by the Examiner

UNITED STATES PATENTS

| | | | |
|---|---|---|---|
| 2,159,569 | 5/1939 | Ruzicka | 260—397.4 |
| 2,374,369 | 4/1945 | Miescher | 260—397.4 |
| 2,492,190 | 12/1949 | Sarett | 260—397.4 |
| 2,678,933 | 5/1954 | Meister | 260—397.45 |
| 2,752,369 | 6/1956 | Holysz | 260—397.3 |
| 2,781,368 | 2/1957 | Heyl et al. | 260—397.45 |
| 2,793,217 | 5/1957 | Muller | 260—397.45 |
| 2,793,218 | 5/1957 | Herr | 260—397.45 |
| 2,813,880 | 11/1957 | Campbell et al. | 260—397.4 |
| 2,813,883 | 11/1957 | Herr | 260—397.45 |
| 2,843,609 | 7/1958 | Colton | 260—397.5 |
| 2,844,605 | 7/1958 | Pederson | 260—397.47 |
| 2,845,381 | 7/1958 | Tindall | 196—90 |
| 2,873,286 | 2/1959 | Campbell et al. | 260—397.46 |
| 2,877,242 | 3/1959 | Sondheimer et al. | 260—397.45 |
| 2,900,382 | 8/1959 | Sondheimer et al. | 260—239.55 |
| 2,927,921 | 3/1960 | Oliveto et al. | 260—239.55 |

OTHER REFERENCES

Antonucci: J. Org. Chem. 17, 1341 (1952).
"Elsevier's Encyclopedia of Organic Chemistry," vol. 14, page 149 (New York: Elsevier Pub. Co., Inc., 1940).
Fieser: Organic Chemistry, 1950, pages 151 and 152 and pages 991 and 998.
Fieser et al.: Steroids, pages 200, 201 and 692 (1959), Reinhold Pub. Co., New York.
Herzog: J.A.C.S. 75, 4425 (1953).
Pincus et al.: The Hormones, vol. III, 1955, pages 549–550 and 552–553.

LEWIS GOTTS, *Primary Examiner.*

B. E. LANHAM, LESLIE H. GASTON, MORRIS LIEBMAN, *Examiners.*

A. J. YARTZOFF, T. J. MORGAN, P. O'DAY, WALTER A. MODANCE, *Assistant Examiners.*